Aug. 24, 1965　　　R. T. FULTON　　　3,202,223
CUSHION PLOW TRIP
Filed March 2, 1964
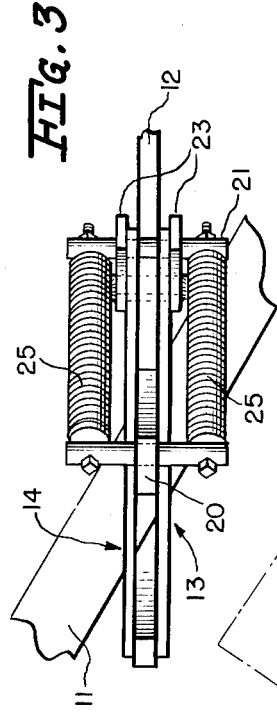
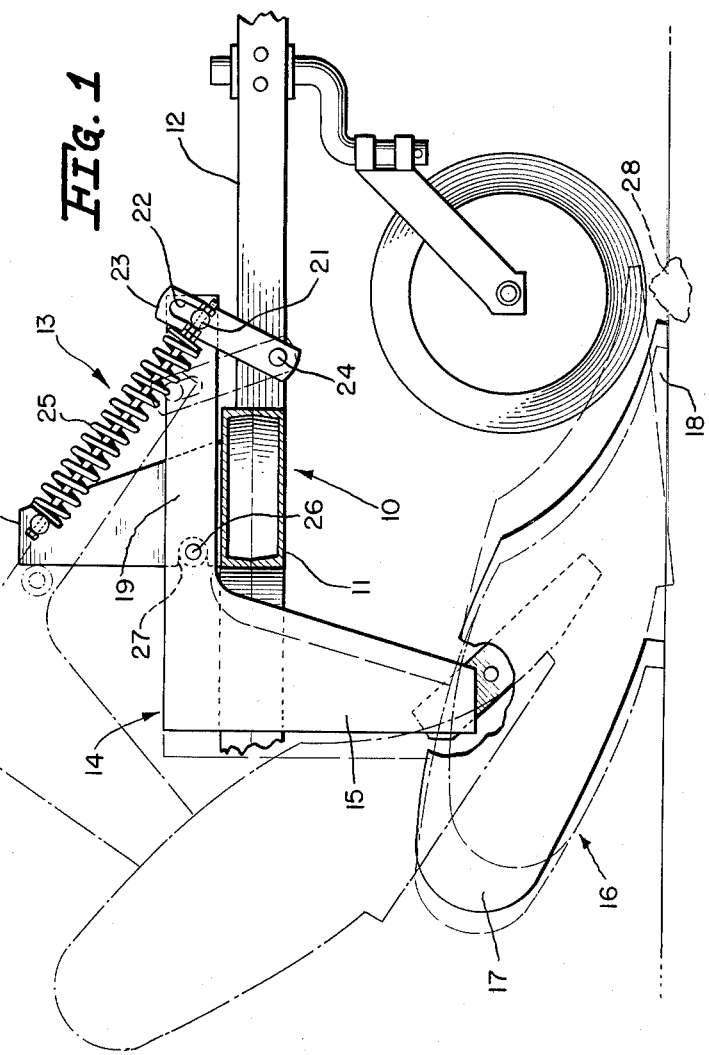
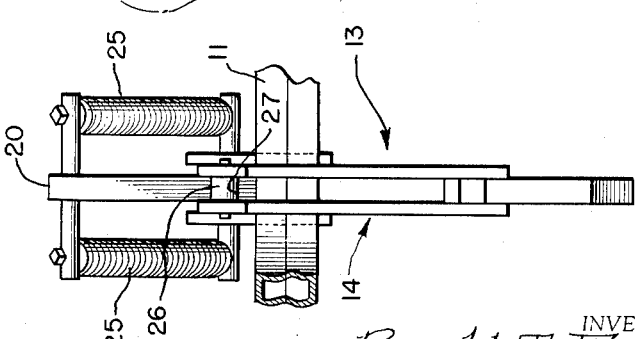
INVENTOR.
Ronald T. Fulton
Atty.

3,202,223
CUSHION PLOW TRIP
Ronald T. Fulton, Tinley Park, Ill., assignor to International Harvester Company, Chicago, Ill., a corporation of New Jersey
Filed Mar. 2, 1964, Ser. No. 348,740
6 Claims. (Cl. 172—264)

This invention relates to earth working implements and particularly to cushion trip mechanism therefor. More specifically, the invention concerns cushion spring tripping mechanism for a moldboard plow.

Tripping devices for moldboard plows and the like are well known. Such mechanism is provided to allow the plow unit to swing backwardly and upwardly when abnormal draft conditions are encountered which might damage the implement. Cushioning devices are usually incorporated with the tripping mechanism to minimize the shock to the implement when encountering an obstruction.

Many of the obstructions encountered by a plow bottom during operation exert a force in a direction tending to swing the plow unit rearwardly and upwardly until the obstruction is passed. However, particularly in rocky soil, a common form of obstruction is a rock or the like having a plow engaging surface so disposed that, upon engagement thereof by the forward end or point of a plow bottom, it exerts a force against the plow bottom having a vertically upwardly directed component tending to revolve the plow unit in a direction opposite to the direction in which it trips rearwardly and upwardly. Stating the problem in another way, when facing the side of the plow, obstructions are encountered in the soil which direct forces against the plow unit which would tend to revolve it about a pivot in both clockwise and counterclockwise directions.

The present invention has for its object the provision of an improved earth working implement incorporating therein means for off-setting substantially all of the abnormal ground forces acting against the earth working unit during operation.

Another object of the invention is the provision of an improved implement such as a moldboard plow attachment mounted on a supporting frame by means accommodating angular movement of the front end of the plow bottom upwardly when encountering one type of obstruction and causing the rear end of the plow bottom to swing angularly upwardly in the other direction upon encountering another type of obstruction.

Another object of the invention is to provide means for mounting a plow unit upon a supporting frame whereby the plow unit is maintained in operating position during normal operation but is permitted to swing in response to abnormal ground forces encountered thereby, in either direction about a transverse axis.

Other objects and advantages of the invention will become clear from the following detailed description when read in conjunction with the accompanying drawings wherein:

FIGURE 1 shows a sectional view of a portion of a plow supporting frame upon which is mounted a moldboard plow unit incorporating the features of this invention, FIGURE 2 is a view in rear elevation of the structure shown in FIGURE 1, and FIGURE 3 is a plan view of the structures shown in FIGURES 1 and 2.

In the drawings the numeral 10 designates a plow supporting frame including a diagonally disposed beam 11 and a forwardly projecting tool bar 12. Mounted upon the beam 11 is an earth working unit 13 including a standard 14 having a vertical section 15 upon the lower end of which is mounted a plow bottom 16 having a rear or moldboard section 17 and a forward share or point section 18. The upper end of standard 14 has a forwardly projecting upper section 19, and consists of spaced plates, the forward portions 19 of which straddle an upright 20 affixed to beam 11.

The forward end of section 19 of the standard carries a pivot element in the form of a pin 21 extending between the plates forming the standard and slidable in another pivot element in the form of a generally vertical extending slot 22 formed in the upper end of a lever 23 pivotally mounted at 24 upon the bar 12.

As shown in dotted lines in FIGURE 1, standard 14 is longitudinally slidable relative to the supporting frame 10 in response to longitudinal shifting or rocking movement of lever 23. The rearward movement of the tool carrying standard relative to the frame is opposed by a compression spring 25 anchored at its forward end to pivot means consisting of the pin 21 in slot 22, and at its other end to the upper end of upright 20, the spring 25 thus tending to yieldably maintain the plow unit in the solid line position of FIGURE 1. Spring 25 is one of a pair forming spring means which acts as a shock absorber for the plow unit 13 when abnormal draft conditions are encountered. For example, when a rock or other obstruction is encountered by the forward end 18 of the plow bottom exerting a force in a direction downwardly against the forward end of the bottom the plow unit tends to revolve about the axis of pivot pin 21 in a clockwise direction as viewed in FIGURE 1.

In normal operating position the plow unit operates in the solid line position of FIGURE 1. A pivot element in the form of a pin 26 is longitudinally spaced rearwardly of pivot pin 21 and is mounted between the plates of standard 14, and the central portion thereof if received in another pivot element in the form of a slot 27 formed in the rear edge of upright 20 and opening rearwardly therefrom. Thus, upon the plow bottom 16 encountering an obstruction of the type referred to which tends to trip the plow unit in a clockwise direction as viewed in FIGURE 1, the plow unit moves rearwardly against the action of springs 25 until pin 26 is released from slot 27 and rides up the rear edge of upright 20 in the manner indicated in dotted lines in FIGURE 1.

Another type of construction frequently encountered, and its relationship to the point of the plow bottom, is indicated at 28 and consists of a rock or the like having a face over which the plow bottom tends to ride, in that the lower face of the point of the plow engages the obstruction and tends to be lifted thereby, exerting a force upwardly in a direction to rock the plow counterclockwise. Until the time of the present invention the engagement of the plow bottom with an obstruction of this type tending to lift it by the front end caused frequent breakage of the plow points as well as other damage. The present invention avoids such a circumstance and prevents damage to the plow by permitting limited angular movement of the tool carrying standard about the pivot axis of the rearmost pivot pin 26. To accomplish this, lost motion is provided in the form of the riding of pin 21 in slot 22 of lever 23, springs 25 exerting force in a direction to hold pin 21 at the bottom of slot 22, the upward movement of the forward end of the plow bottom 16 by virtue of encountering the obstruction 28 being indicated by dotted lines in FIGURE 1.

It is believed that the construction and operation of the novel plow cushioning and trip device of this invention will be clearly understood from the foregoing description. It should likewise be understood that the invention has been described in its preferred embodiment and that modifications may be made therein without departing from the spirit of the invention or the scope of the appended claims.

What is claimed is:

1. In trip plows and the like, a supporting frame member, a standard member carrying an earth working tool at its lower end, means for mounting said standard member on said frame member for longitudinal movement of the standard member relative to the frame member, said mounting member including pivot means accommodating swinging of said standard member upwardly in one direction about a transverse axis after a predetermined longitudinal movement of the standard member relative to the frame member in response to abnormal draft forces acting on the tool in said one direction, means in the mounting of said standard member on said frame member accommodating swinging of said standard member in the other direction about a transverse axis prior to said longitudinal movement of the standard member relative to the frame member in response to abnormal draft forces acting on the tool in said other direction, and spring means operatively connected between said frame member and said standard member for yieldably opposing said swinging of said standard member.

2. In a cushion spring trip assembly for an implement having a supporting frame including an upright member, an earth working unit mounted on the frame comprising, a tool-carrying standard including a generally vertical section having an earth working tool at its lower end and an upper forwardly extending generally horizontal section, means pivotally connecting said standard to said upright member, a longitudinally shiftable member mounted on the frame, means pivotally connecting said horizontal section to said shiftable member, said shiftable member being shiftable rearwardly with said tool-carrying standard in response to draft forces on said tool during operation, spring means operatively connected between the frame and said shiftable member to yieldably oppose rearward movement of said standard, means serving as a transverse pivot connecting the standard to the frame, the connection of said horizontal section to said shiftable member being such as to accommodate tilting of the forward end of said horizontal section upwardly about said pivot when draft conditions exert a force upwardly against the forward end of said tool.

3. The invention set forth in claim 2, wherein the connection of said horizontal section of the standard to said shiftable member includes lost motion accommodating said tilting of the forward end of said horizontal section upwardly about said pivot.

4. The invention set forth in claim 3, wherein said shftable member is a lever pivotally mounted at one end on the frame for longitudinal swinging movement about a transverse axis and the connection between said spring means and said lever includes a pin carried by said spring means and a slot provided in the other end of said lever slidably receiving said pin.

5. The invention set forth in claim 2, wherein the pivotal connection between said standard and said upright member includes a longitudinally extending slot formed in the upright member and a pin carried by said standard and slidable in said slot to accommodate rearward movement of said standard in response to abnormal draft forces acting on said tool.

6. In a cushion spring trip assembly for an implement having a supporting frame, a standard having an earth working tool at its lower end, longitudinally spaced pivot elements carried by the frame, complementary pivot elements carried by forward and rearward portions of said standard and cooperative with the pivot elements on the frame to provide longitudinally spaced pivot means connecting the standard to the frame, means in the connection of the standard to the frame accommodating longitudinal movement of the standard relative to the frame, the forwardmost of said pivotal connections between the standard and the frame including lost motion in a generally vertical plane accommodating upward movement of the forward portion of the standard about the rearmost of said pivotal connections prior to said longitudinal movement of the standard relative to the frame, and spring biasing means operatively connected between said supporting frame and said standard opposing said upwardly movement of the forward portion of the standard.

References Cited by the Examiner
UNITED STATES PATENTS
3,052,308   9/62   Quanbeck _____ 172—264
FOREIGN PATENTS
519,046   3/40   Great Britain.
161,484   11/57   Sweden.

T. GRAHAM CRAVER, *Primary Examiner.*